United States Patent [19]

Redekop et al.

[11] Patent Number: 5,232,405
[45] Date of Patent: Aug. 3, 1993

[54] APPARATUS FOR CHOPPING AND DISCHARGING STRAW FROM A COMBINE HARVESTER

[76] Inventors: Leo L. Redekop; Helen E. Redekop, both of Box 178A, R.R.#4, Saskatoon, Saskatchewan, Canada, S7K 3J7

[21] Appl. No.: 817,625

[22] Filed: Jan. 7, 1992

[51] Int. Cl.⁵ ............................................. A01F 12/40
[52] U.S. Cl. ...................................... 460/112; 56/505
[58] Field of Search ................ 460/112, 111; 56/504, 56/505; 239/668, 681

[56] References Cited

U.S. PATENT DOCUMENTS

| | | | |
|---|---|---|---|
| 3,670,739 | 6/1972 | Rowland-Hill | 460/112 X |
| 3,693,335 | 9/1972 | Mathews | 56/504 X |
| 3,744,725 | 7/1973 | Grataloup | 239/681 X |
| 4,292,795 | 10/1981 | Linn | 56/503 |
| 4,591,102 | 5/1986 | Clarke | 239/655 |
| 4,637,406 | 1/1987 | Guinn et al. | 460/112 |
| 4,691,507 | 9/1987 | Schwitters | 56/504 X |
| 4,892,504 | 1/1990 | Scott et al. | 460/112 |
| 5,042,973 | 8/1991 | Hammarstrand | 56/504 X |

*Primary Examiner*—Terry Lee Melius
*Attorney, Agent, or Firm*—Adrian D. Battison; Stanley G. Ade; Murray E. Thrift

[57] ABSTRACT

A straw and chaff chopping and discharge arrangement is attached to a rear discharge opening of a combine harvester. The discharge apparatus includes a horizontal hub member transverse to the combine and carrying upon it a plurality of blade members arranged in radial planes along the length of the hub member. Each blade member includes a support plate lying in a radial plane together with a transverse blade surface which is inclined so that it extends outwardly and forwardly to generate a high velocity of air rotating with the chopping assembly around the axis. A housing is shaped with a stripping edge at the discharge opening to cause the rotating air and chopped material to be expelled through the discharge opening upwardly and rearwardly from the housing. The material can be spread across the ground up to a width equal to the swath from which the crop has been cut to provide even spreading of the material across the ground. Alternatively the material can be discharged into a transportation wagon for collection.

20 Claims, 4 Drawing Sheets

APPARATUS FOR CHOPPING AND DISCHARGING STRAW FROM A COMBINE HARVESTER

FIELD OF THE INVENTION

This invention relates to an apparatus for chopping and discharging material which is particularly but not exclusively designed for receiving straw and optionally chaff from the discharge areas of a combine harvester, for applying a chopping action to the material and for generating a discharge stream of the chopped materials. Such a discharge stream can be used either for transportation of the chopped materials into a storage wagon or for spreading of the materials across the ground.

BACKGROUND OF THE INVENTION

The conventional combine harvester after separation of straw and chaff from the materials to be collected, discharges the straw and chaff from a rear discharge area of the combine harvester. The straw is generally discharged at the rearmost part of the housing in a generally downward direction from the straw walkers or other separation system.

The chaff is generally discharged at a position just in front of the straw discharge point from the rear end of the chaffer sieve.

In many cases the combine includes a chopper assembly mounted on the combine harvester body at a position just downward of the straw discharge point for applying a chopping action to the straw. Generally the straw chopper comprises a horizontal hub member mounted across the rear of the combine harvester body with a plurality of chopper blades or flails mounted on the hub member for rotation about the axis of the hub member. The straw is simply fed downwardly onto the chopper at a position forwardly of the axis, is grasped by the blade members and carried thereby past a plurality of stationary blades which apply a chopping or cutting action to the straw that is carried. The straw after chopping is then simply thrown from the flails rearwardly of the combine. Some attempts have been made to spread the straw by providing fins which curve rearwardly and then outwardly to the sides to deflect the straw as it is thrown across the width wider than that of the combine harvester itself.

Such choppers are however ineffective in many ways. Most importantly there is little spreading action of the straw due to the fact that the air surrounding the straw is basically stationary. Thus the straw is simply thrown into the air rather than as part of a stream of air thus causing the straw to rapidly loose velocity and drop to the ground.

In addition the chopping action is somewhat limited and can fail on tougher materials causing the unchopped materials to wrap around the chopper assembly thus rapidly causing a blockage.

The blades of the chopping assembly simply comprise a flat blade lying in a radial plane of the chopper axis with the blades passing between stationary blades surfaces also lying in a radial plane but offset from the rotating blades of the chopper assembly.

Some attempts have been made to improve the chopping action simply by decreasing the spacing between the rotating blades and the stationary blades but this has had no effect on the ability of the chopping assembly to propel the chopped materials.

Furthermore, if the chopping assembly were fed with chaff from the chaff discharge opening of the combine harvester this would have little or no effect on the chaff so the chaff is generally discharged simply rearwardly of the combine harvester.

Attempts have been made to increase the spreading action of both the chaff and the straw by providing fans which generate an air stream sucking air and the material into the centre of the fan in a direction longitudinal of the axis of the fan and then propelling the material and the air stream radially outwardly from the fan. In this case the fan is generally mounted with the axis vertical so the blades lie in a horizontal plane. One example of a device of this type is shown in U.S. Pat. No. 4,235,716 (Scott et al) and is known in practice as "Straw Storm" (TM). A further example is shown in U.S. Pat. No. 4,292,795 (Linn). A device designed for spreading chaff separately from the straw is shown in U.S. Pat. No. 4,591,102 (Clarke) and is known as "Hurricane" (TM) chaff spreader.

These devices have achieved some success but are relatively expensive, complex and require the use of gear boxes which are of course always prone to failure.

SUMMARY OF THE INVENTION

It is one object of the present invention, therefore, to provide an improved apparatus for chopping and discharging material.

According to a first aspect of the present invention there is provided an apparatus for chopping and discharging materials comprising a housing having a feed opening and a discharge opening, a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member in a radial plane of said axis, the blade members being arranged at spaced positions along the length of the hub member, the feed opening being arranged longitudinally of the chopping assembly so as to deposit the material onto the chopping assembly in a direction generally inwardly toward the axis, the discharge opening being arranged longitudinally of the chopping assembly so as to allow discharge of the material generally radially outwardly from the chopping assembly, each of the blade members including a blade surface portion extending generally longitudinally of the axis and generally outwardly from the axis, the blade surface portion being inclined such that a radially outer part of the blade surface portion is arranged angularly forwardly of a radially inner part of the blade surface portion.

According to a second aspect of the present invention there is provided a blade member for the straw chopper of a combine harvester, the blade member comprising a planar support portion having a transverse hole therethrough for attachment to a rotating hub member of the straw chopper with the planar support portion lying in a radial plane of the hub member and a blade surface portion mounted on said support portion and extending in a direction generally at right angles thereto and generally outwardly away from said hole, the blade surface portion being inclined such that a first part of the blade surface portion remote from the hole is arranged angularly forwardly of a second part of the blade surface portion spaced inwardly of the first part.

According to a third aspect of the present invention there is provided a combine harvester comprising a combine harvester body and means for discharging separated straw from a rear discharge area of the combine harvester body, an improvement comprising a chopper and discharge apparatus, means mounting the apparatus on the combine harvester body at a position adjacent the rear discharge area for receiving material exiting from the combine harvester body, the apparatus comprising a housing having a feed opening and a discharge opening, a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member in a radial plane of said axis, the blade members being arranged at spaced positions along the length of the hub member, the feed opening being arranged longitudinally of the chopping assembly so as to deposit the material onto the chopping assembly in a direction generally inwardly toward the axis, the discharge opening being arranged longitudinally of the chopping assembly so as to allow discharge of the material generally radially outwardly from the chopping assembly, each of the blade members including a blade surface portion extending generally longitudinal of the axis and generally outwardly from the axis, the blade surface portion being inclined such that a radially outer part of the blade surface portion is arranged angularly forwardly of a radially inner part of the blade surface portion, said hub member being mounted with the axis thereof transverse to the combine harvester body and horizontal, said housing being arranged such that the discharge opening is arranged at a position upward and rearward of the axis and including means for directing air and material discharged from the discharge opening.

One embodiment of the present invention will now be described in conjunction with the accompanying drawings, in which:

DESCRIPTION OF THE DRAWINGS

In the drawings like characters of reference indicate corresponding parts in the different figures.

DETAILED DESCRIPTION

Figure 3:
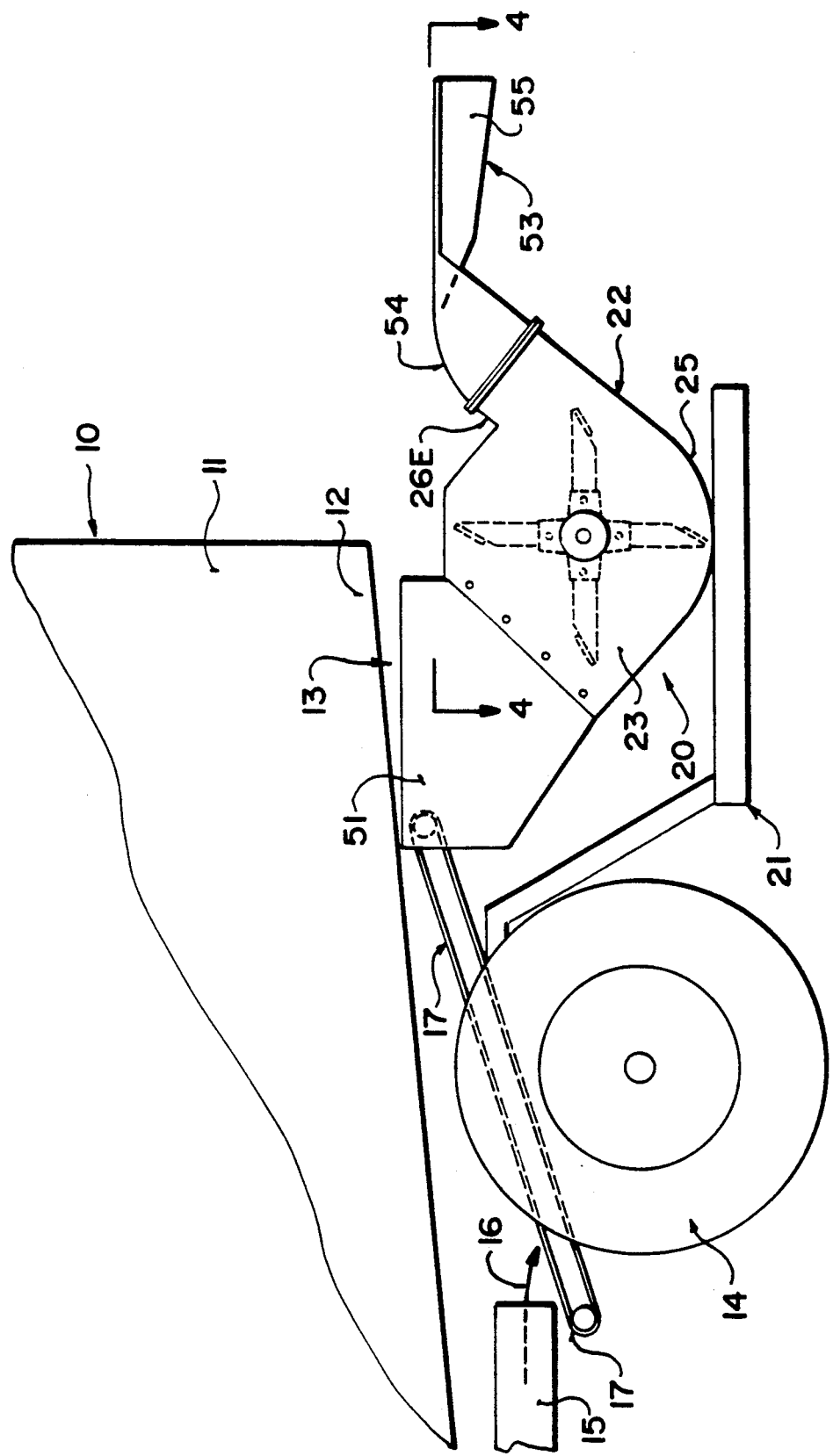
FIG. 3 is a side elevational view of the apparatus of FIGS. 1 and 2 mounted upon a conventional combine harvester.

In FIG. 3 a conventional combine harvester is generally indicated at 10 and the details of this machine will not be shown as is of course well known to one skilled in the art. Very briefly the combine harvester includes a main combine body 11 at a rear part of which generally indicated at 12 is provided a straw discharge area 13 through which straw from the straw separation system (not shown) exits from the combine body 11. The body is mounted upon a ground wheel 14 for transportation across the ground. In front of the ground wheel is provided a conventional chaffer sieve 15 which separates the chaff from the materials to be collected and discharges the chaff rearwardly as indicated by the arrow 16. A conveyor 17 is indicated schematically for transporting the chaff rearwardly and upwardly to be released into the area of the rear straw discharge 13 so the straw and the chaff are discharged simultaneously from the area 13.

The chopping and discharge apparatus according to the present invention is indicated generally at 20 and comprises a mounting frame 21 attached to the body of the combine, the mounting frame being shown only schematically as this is not important to the structure of the device and would be well apparent to one skilled in the art.

Upon the mounting frame 21 is mounted a housing 22 of the chopping and discharge apparatus. The housing is shown in more detail in FIGS. 1, 2 and 4 and comprises two end walls 23 and 24 which are parallel and vertical and spaced by a width approximately equal to the width of the discharge area 13 of the combine harvester. The end walls 23 and 24 are connected by a curved lower wall 25 and a top wall 26 which extend from one end wall to the other end wall and connect the housing into a substantially closed housing structure surrounding a hollow interior leaving a feed opening 27 which is open into the housing and a discharge opening 28 which is open to the housing.

Within the housing is mounted a rotating chopping assembly generally indicated at 30 comprising a pipe 31 extending along the full length of the housing with closed ends 32 upon which are mounted stub shafts 33 each projecting outwardly from a respective one of the closed ends. The stub shafts 33 project through openings in the end walls 23 and 24 respectively and are mounted therein for rotation by suitable bearings (not shown). The pipe 31 is thus rotatable about a central axis of the pipe on the stub shafts and rotation of the pipe can be driven by a pulley 34 on one of the stub shafts driven by a belt (not shown) from the conventional drive system of the combine harvester.

Figure 1:
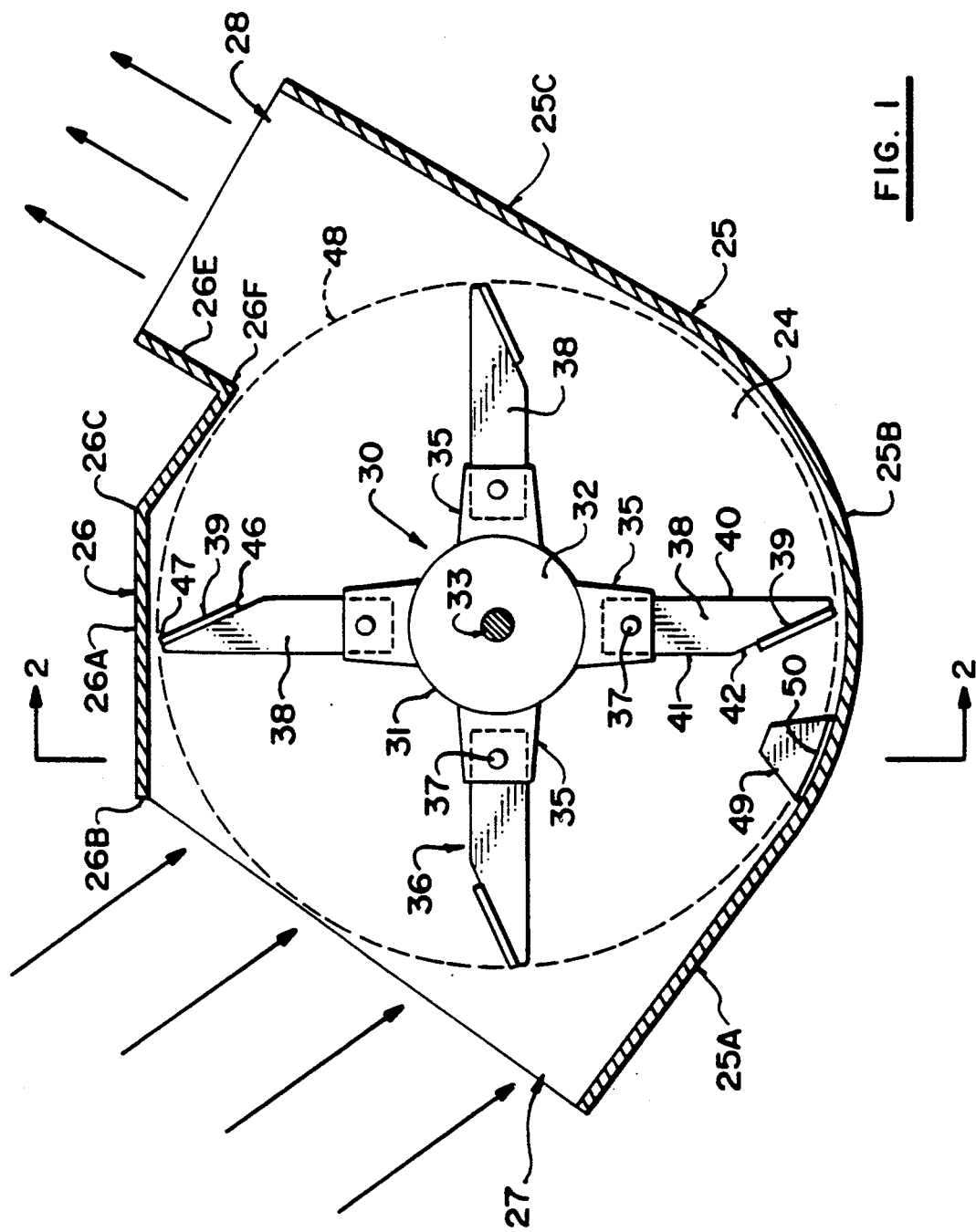
FIG. 1 is a cross sectional view through a straw chopping and discharge apparatus according to the present invention, the cross section being taken along the lines 1—1 of FIG. 2.
Figure 2:
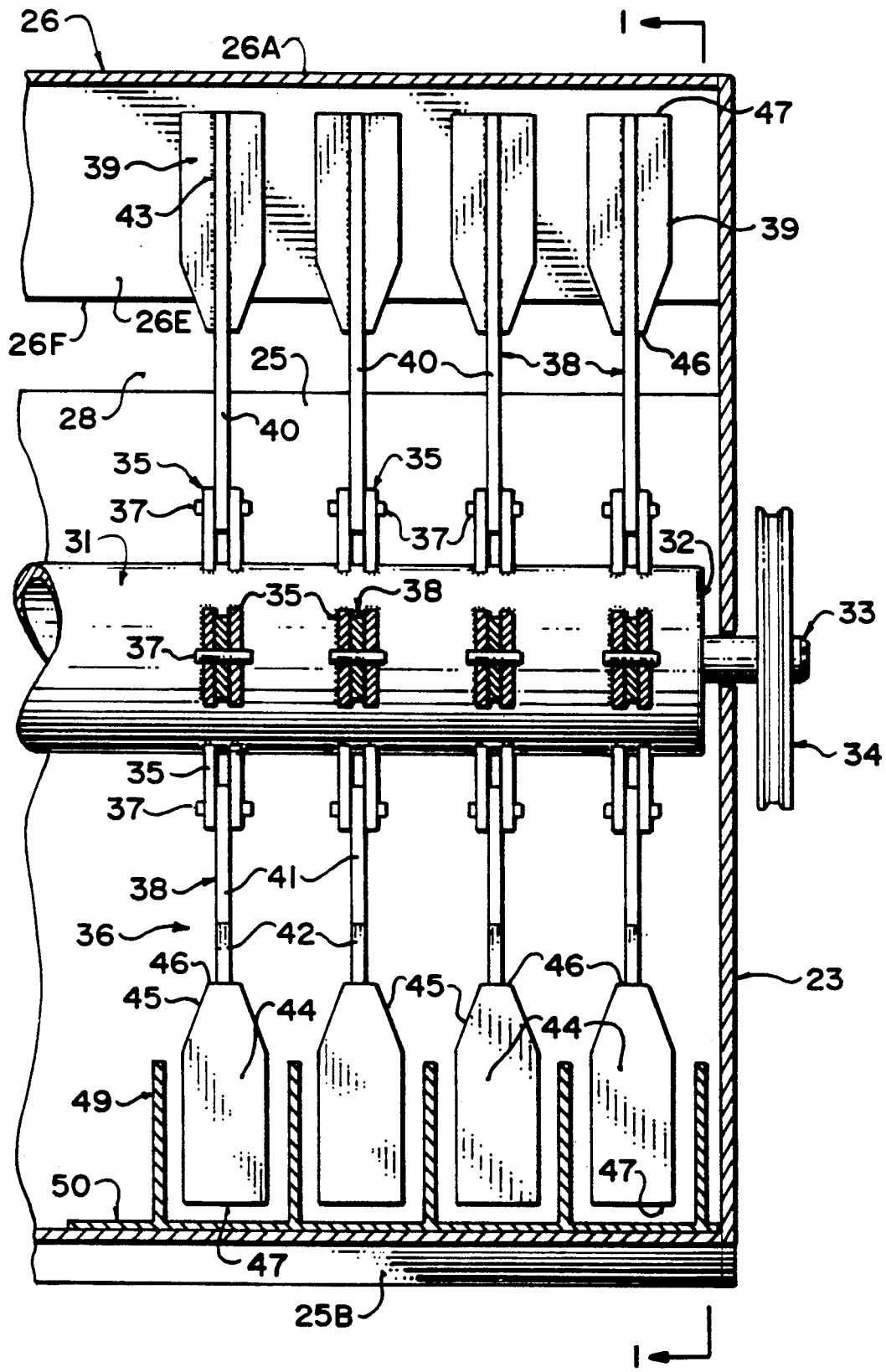
FIG. 2 is a cross sectional view of the apparatus of FIG. 1 taken along the lines 2—2.

On the outside surface of the pipe 31 is welded a plurality of clevises 35 each comprising a pair of upstanding lugs defining a channel therebetween for receiving and supporting a respective one of a plurality of blade members 36. Each blade member is carried in a respective one of the clevises 35 and is mounted upon a pin 37 so the blade member 36 can rotate about the pin in a manner of a flail. However centrifugal action will normally maintain the blade members extending radially outwardly from the axis of the pipe. The clevises define the channels therebetween lying in radial planes of the axis of the pipe and the clevises are spaced longitudinally of the axis so the blade members can be arranged at angularly spaced positions around the pipe and at longitudinally spaced positions along the pipe with the blade members lying in and rotating in radial planes of the pipe. As shown in FIGS. 1 and 2, the clevises and associated blade members are spaced angularly at 90 degrees around the pipe so that each radial plane contains four such blade members at equiangularly spaced positions around the axis.

In an alternative arrangement (not shown), which is preferred, each radial plane contains only two such blade members with the blade members of a next adjacent radial plane being offset through 90 degrees. Thus the blade members in each radial plane are arranged at opposed positions and there are equal numbers of blade members in one axial plane as in the axial plane at right angles thereto to provide a balance action around the pipe. It will be appreciated that the number of blade members and the spacing of the blade members can be varied in order to increase or decrease the air pumping action and the chopping action which are obtained, as described hereinafter.

Each blade member comprises a blade support portion 38 and a transverse blade surface 39. The support portion 38 is planar and is formed from a flat plate of metal. The support portion 38 includes a leading edge 40 and a trailing edge 41. The leading edge 40 extends outwardly to a position at a remote end of the blade member. The trailing edge 41 is parallel to the leading edge 40 but terminating at a position spaced inwardly from the outermost edge. An inclined outer edge 42 extends from the outer end of the edge 41 to the outer end of the leading edge 40 extending in a straight line therebetween and thus inclined at an angle of the order of 30 degrees relative to the leading edge 40.

The transverse blade portion 39 is attached to the inclined outer edge 42 by a weld line 43. The blade portion 39 is thus flat and extends transversely to the support portion 38 at right angles thereto and extends outwardly equally to each respective side of the support portion 38. The blade portion 39 has an initial rectangular section 44 and from that section 45 tapers inwardly and upwardly toward the edge 42 as best shown in FIG. 2. The blade portion 39 is thus inclined so that it extends forwardly from its innermost end toward its outermost end at the outer edge of the blade member. Thus an innermost edge 46 of the blade portion is spaced angularly rearwardly of an outermost edge 47 of the blade portion.

The blade members therefore act to cause rotation of air around the central hub on which the blade members are carried. Conventionally such rotation will cause air to be expelled radially outwardly from any openings in the housing and to be drawn into the rotating air stream from an axial end.

However in this case the axial ends of the housing are closed by the end plates 23 and 24 to prevent any movement into the rotating chopper assembly from the end locations. The housing is however shaped so as to cause air to be drawn inwardly into the chopper assembly from the feed opening 27 and to be expelled through the discharge opening 28. The housing is shaped by the curved lower wall 25 which extends from an initial tangential portion 25A around a cylindrical portion 25B to a second tangential portion 25C extending toward the opening 28. Air moving into the housing from the opening 27 is thus caused to remain within the bounds of the blade members by the curved outer wall or lower wall 25 and is released from the blade members through the discharge opening 28. However in order to prevent a symmetrical movement of air, the upper wall 26 is shaped so it is non-symmetrical and causes the expulsion of air through the discharge opening 28.

In particular the upper wall 26 includes a horizontal section 26A commencing at one edge 26B defining an edge of the opening 27. However at an opposed edge 28C of the upper horizontal plate 26A is provided an additional upper plate section 26D and 26E. The plate portion 26D extends downwardly from the edge 26C toward the envelope 48 defining the path of the outermost edge 47 of the blade members. The plate portion 26E extends upwardly away from the envelope and lies parallel to the tangential portion 25C thus leading in parallel manner to the opening 28. These plate portions 26D and 26E converge at an edge 26F which lies closely adjacent the envelope 48 and thus acts to strip air from the rotating system to cause it to pass along the underside of the plate portion 26E to the outlet 28. This stripping action ensures that air escapes through the opening 28. Downstream of the edge 26F, the upper plate 26 gradually diverges away from the envelope 48 and terminates at the edge 26B which is spaced from envelope to prevent any stripping action at that point. Air is thus gradually drawn into the rotating system through the feed opening 27 to be constrained with the rotating chopper assembly by the blade members to be carried around pass the opening 27 to be compressed against the lower part of the housing wall 25 and then expelled through the discharge opening 28.

This shape of the housing together with the forward inclination of the blade portion 39 surprisingly generates a significant air flow through the housing from the inlet opening 27 to the discharge opening 28. The chopper assembly thus draws in material deposited at the opening 27 and expels the material together with a significant air stream out through the discharge opening 28.

The chopper assembly further includes a plurality of stationary blades 49 mounted upon a base plate 50 carried on the inside of the lower wall 25. The stationary blades 49 as best shown in FIG. 2 are in vertical position spaced by a sufficient distance to receive the blade members passing therebetween. The width of the blade members are arranged so that the side edges thereof pass closely adjacent to the stationary blade members but not so close as to cause possible damage in the event of any misalignment due to engagement with the material.

Surprisingly, therefore, the shape of the blade members and particularly the forward inclination of the transverse blade surface thereof in conjunction with the shape of the housing and the position of the stationary blade provides a vigorous chopping action which will cause chopping of the materials without significant possibility of the materials wrapping around the chopper assembly and furthermore generates a significant high velocity air stream exiting through the discharge opening 28 to carry the material outwardly therefrom.

As shown in FIG. 3, the inlet opening 27 is connected to a hopper element 51 which confines the material discharging from the opening 13 and from the conveyor 17 to fall into the feed opening 27. The hopper element is formed from a plurality of plates arranged in a suitable manner to converge the material toward the inlet opening. However, the edge of the inlet opening will also act to draw in any dust and materials tending to escape to the sides thus significantly reducing the release of dust from the rear of the combine which is a conventional nuisance.

Figure 4:
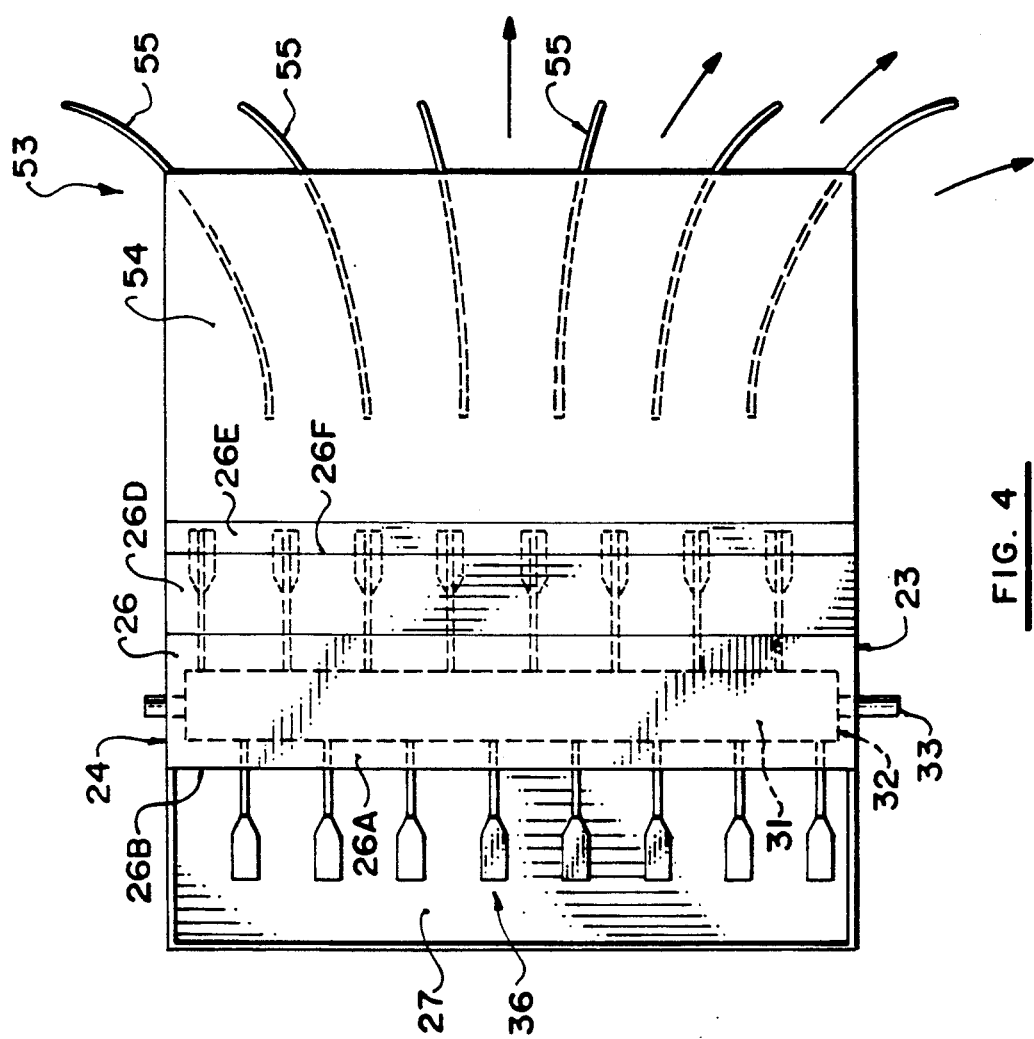
FIG. 4 is a top plan view of the apparatus of FIG. 3 taken along the lines 4—4 of FIG. 3.

As shown in FIGS. 3 and 4, a guide structure is indicated generally at 53 and comprises a top surface 54 attached to and extending along the full length of the plate 26E so as to gradually curve therefrom to a portion extending rearwardly and lying substantially in a horizontal plane. On the underside of the plate 54 is provided a plurality of fins 55 which extend vertically downwardly therefrom and are shaped to curve outwardly toward the sides so as to provide a spreading action on the material exiting form the discharge opening 28. Thus the material discharged is caused to flow generally rearwardly by the plate 54 and then is turned toward the sides by the fins 55. This movement of both the material and the air stream carrying the material causes a significant spreading action of the material. This spreading action can be maximized by confining the air flow to form jets of air projecting outwardly and in different directions by minimizing the dissipation of the air movement. It has been determined in practice that by maximizing the control of the air flow, the air flow can be detected at distances up to 30 feet from the side of the machine and can cause a spreading action of the material to approximately this distance to the sides of the machine. In practice, with modern farming methods, it is possible for a combine harvester to be acting upon material formed into a swath from a width of up to 60 feet so it is necessary to spread the material up to this distance of 60 feet to ensure that it is evenly spread over the area from where the the crop has been cut.

In a recent development of no-till farming, it has been found to be particularly important to ensure that the straw and the chaff are returned to the land in an even spread over a width substantially equal to the width of the swath from which the material has been cut. The spreading action can be obtained by the device as described above due to the high velocity of air movement which is surprisingly obtained by the shape of the housing and more particularly by the shape of the blade members including the forwardly inclined transverse blade surface.

In an alternative arrangement (not shown), the spreading guide element 53 can be removed and instead a duct can be attached which propels the material in a stream rearwardly from the discharge opening for collection into a conventional transportation wagon.

Since various modifications can be made in my invention as hereinabove described, and many apparently widely different embodiments of same made within the spirit and scope, it is intended that all matter contained in the accompanying specification shall be interpreted as illustrative only and not in a limiting sense.

We claim:

1. A combine harvester comprising a combine harvester body, means for discharging separated straw from a rear discharge area of the combine harvester body, a chopper and discharge apparatus and means mounting the apparatus in the combine harvester body at a position adjacent the rear discharge area for receiving straw therefrom, the apparatus comprising a housing having a feed opening and a discharge opening, a chopping assembly mounted in the housing and comprising a hub member mounted for rotation about a longitudinal axis of the hub member and a plurality of blade members mounted on the hub member for rotation therewith about said axis, a plurality of stationary blades mounted in the housing in axially spaced positions therealong the stationary blades lying in parallel radial planes, each blade member projecting generally outwardly form the hub member in a radial plane of said axis, the blade members being arranged at spaced positions along the length of the hub member such that rotation of the hub member causes each of the blade members to pass between a respective two of the stationary blades in a cutting action, the feed opening being arranged longitudinally of the chopping assembly so as to deposit the material onto the chopping assembly in a direction generally inwardly toward the axis, the discharge opening being arranged longitudinally of the chopping assembly so as to allow discharge of the material generally radially outwardly from the chopping assembly, each of the blade members including a blade surface portion extending generally longitudinally of the axis and generally radial outwardly from the axis, the blade surface portion being inclined such that a radially outer part of the blade surface portion is arranged angularly forwardly of a radially inner part of the blade surface portion.

2. The combine harvester according to claim 1 wherein the radially outermost part of the blade surface portion is arranged most angularly forward and a radially innermost part of the blade surface portion is arranged most angularly rearward.

3. The combine harvester according to claim 1 wherein the blade surface portion is substantially planar.

4. The combine harvester according to claim 1 wherein the blade surface portion is shaped such that each imaginary line transverse thereto and lying in the surface thereof extends parallel to said axis.

5. The combine harvester according to claim 1 wherein each blade member includes a planar support portion lying substantially in a radial plane of said axis with said blade surface portion mounted thereon and supported thereby.

6. The combine harvester according to claim 5 wherein the planar support portion includes a front edge extending substantially radially outwardly from the hub member to a radially outermost edge of the blade member, a rear edge extending substantially radially outwardly from the hub member to a position spaced inwardly from the radially outermost edge and an inclined outer edge extending from the rear edge to the front edge, the blade surface portion being attached to said inclined outer edge so as to follow the inclination thereof.

7. The combine harvester according to claim 1 wherein the discharge opening has a first side edge and a second side edge each substantially parallel to the axis with the first side edge arranged angularly forwardly of the second side edge and wherein there is provided stripping means adjacent the first side edge for extracting air carried by the blade members outwardly through the discharge opening.

8. The combine harvester according to claim 7 wherein the stripping means comprises a surface edge portion arranged to approach closer to an outermost edge of the blade members than does a symmetrical surface edge portion of the feed opening.

9. The combine harvester according to claim 8 wherein the surface edge portion comprises a portion of the housing.

10. The combine harvester according to claim 1 wherein each of the feed opening and the discharge opening extends substantially fully along the length of the chopping assembly, a width of the discharge opening in a direction transverse to the length thereof being less than a width of the feed opening in a direction transverse the length thereof, the discharge opening being shaped and arranged to cause air to flow from the chopping assembly substantially radially outwardly through the discharge opening and being shaped differently from the feed opening such that air is drawn into the feed opening.

11. The combine harvester according to claim 10 wherein the housing includes a curved outer wall partly surrounding the chopping assembly and extending from one side of the feed opening to an adjacent side of the discharge opening and extending around the chopping assembly through an angle greater than 180 degrees, the curved wall commencing at a position spaced outwardly from an outermost edge of the blade members, curving inwardly to a position closely adjacent an outermost edge of the blade members, including a portion following the outermost edge of the blade members and a portion extending substantially tangential therefrom to said discharge opening.

12. The combine harvester according to claim 1 wherein the blade surface portion of each blade member comprises a thin plate having two side edges each extending generally radially outwardly from the axis, the side edges being axially spaced such that one side edge passes adjacent to one of the respective two of the stationary blades and the other passes adjacent to the other one of the respective two of the stationary blades.

13. A combine harvester comprising a combine harvester body, means for discharging separated straw from a rear discharge area of the combine harvester body, a chopper and discharge apparatus and means mounting the apparatus in the combine harvester body at a position adjacent the rear discharge area for receiving straw therefrom, the apparatus comprising a housing having a feed opening and a discharge opening, a chopping assembly mounted in the housing and comprising a hub member mounted for rotation about a longitudinal axis of the hub member and a plurality of blade members mounted on the hub member for rotation therewith about said axis, a plurality of stationary blades mounted in the housing in axially spaced positions therealong the stationary blades lying in parallel radial planes, each blade member projecting generally outwardly form the hub member in a radial plane of said axis, the blade members being arranged at spaced positions along the length of the hub member such that rotation of the hub member causes each of the blade members to pass between a respective two of the stationary blades in a cutting action, the feed opening being arranged longitudinally of the chopping assembly so as to deposit the material onto the chopping assembly in a direction generally inwardly toward the axis, the discharge opening being arranged longitudinally of the chopping assembly so as to allow discharge of the material generally radially outwardly from the chopping assembly, each of the blade members including a blade surface portion extending generally longitudinally of the axis and generally radially outwardly from the axis, the blade surface portion being shaped and arranged such that each imaginary line transverse thereto and lying the in the surface thereof extends substantially parallel to said axis.

14. The combine harvester according to claim 13 wherein each blade member includes a planar support portion lying substantially in a radial plane of said axis with said blade surface portion mounted thereon and supported thereby.

15. The combine harvester according to claim 13 wherein the discharge opening has a first side edge and a second side edge each substantially parallel to the axis with the first side edge arranged angularly forwardly of the second side edge and wherein there is provided stripping means adjacent the first side edge for extracting air carried by the blade members outwardly through the discharge opening.

16. The combine harvester according to claim 15 wherein the stripping means comprises a surface edge portion arranged to approach closer to an outermost edge of the blade members than does a symmetrical surface edge portion of the feed opening.

17. The combine harvester according to claim 13 wherein the discharge opening has a first side edge and a second side edge each substantially parallel to the axis with the first side edge arranged angularly forwardly of the second side edge and wherein there is provided stripping means adjacent the first side edge for extracting air carried by the blade members outwardly through the discharge opening.

18. The combine harvester according to claim 17 wherein the stripping means comprises a surface edge portion arranged to approach closer to an outermost edge of the blade members than does a symmetrical surface edge portion of the feed opening.

19. A combine harvester comprising a combine harvester body, means for discharging separated straw from a rear discharge area of the combine harvester body, a chopper and discharge apparatus and means mounting the apparatus in the combine harvester body at a position adjacent the rear discharge area for receiving straw therefrom, the apparatus comprising a housing having a feed opening and a discharge opening, a chopping assembly mounted in the housing and comprising a hub member mounted for rotation about a longitudinal axis of the hub member and a plurality of blade members mounted on the hub member for rotation therewith about said axis, a plurality of stationary blades mounted in the housing in axially spaced positions therealong the stationary blades lying in parallel radial planes, each blade member projecting generally outwardly form the hub member in a radial plane of said axis, the blade member being arranged at spaced positions along the length of the hub member such that rotation of the hub member causes each of the blade members to pass between a respective two of the stationary blades in a cutting action, the feed opening being arranged longitudinally of the chopping assembly so as to deposit the material onto the chopping assembly in a direction generally inwardly toward the axis, the discharge opening being arranged longitudinally of the chopping assembly so as to allow discharge of the material generally radially outwardly from the chopping assembly, each of the blade members including a blade surface portion extending generally longitudinally of the axis and generally radially outwardly from the axis, the blade surface portion comprising a thin plate having two side edges each extending generally radially outwardly from the axis, the side edges being axially spaced such that one side edge passes adjacent to one of the respective two of the stationary blades and the other passes adjacent to the other one of the respective two of the stationary blades.

20. The combine harvester according to claim 19 wherein each blade member includes a planar support portion lying substantially in a radial plane of said axis with said blade surface portion mounted thereon and supported thereby.

* * * * *